(12) United States Patent
Makino et al.

(10) Patent No.: US 7,737,592 B2
(45) Date of Patent: Jun. 15, 2010

(54) MOTOR

(75) Inventors: Yusuke Makino, Kyoto (JP); Yoshio Fujii, Kyoto (JP)

(73) Assignee: Nidec Corporation, Kyoto (JP)

( * ) Notice: Subject to any disclaimer, the term of this patent is extended or adjusted under 35 U.S.C. 154(b) by 348 days.

(21) Appl. No.: 12/016,322

(22) Filed: Jan. 18, 2008

(65) Prior Publication Data

US 2008/0174203 A1    Jul. 24, 2008

(30) Foreign Application Priority Data

Jan. 19, 2007    (JP) .............................. 2007-009675

(51) Int. Cl.
*H02K 3/46* (2006.01)
*H02K 1/28* (2006.01)
(52) U.S. Cl. ............................ 310/156.09; 310/156.13; 310/156.14; 310/156.53; 310/216.114; 310/216.121
(58) Field of Classification Search ................. 310/261, 310/270, 156.09, 13, 14, 49, 51–53, 55, 56, 310/58, 216.114, 116, 121–123
See application file for complete search history.

(56) References Cited

U.S. PATENT DOCUMENTS 4,289,989 A * 9/1981 Schibline ............. 310/216.123
4,358,698 A * 11/1982 Peterson et al. ............. 310/187
4,568,846 A * 2/1986 Kapadia ................. 310/156.83
6,614,142 B1 * 9/2003 Bonnieman et al. ... 310/216.004

FOREIGN PATENT DOCUMENTS

| JP | 08-098473 A | 4/1996 |
|---|---|---|
| JP | 09-224339 A | 8/1997 |
| JP | 10-032946 A | 2/1998 |
| JP | 11-004556 A | 1/1999 |
| JP | 11196545 A * | 7/1999 |
| JP | 2000-023400 A | 1/2000 |
| JP | 3463022 B2 | 11/2003 |
| JP | 2005-184968 A | 7/2005 |
| WO | WO 8908941 A1 * | 9/1989 |

* cited by examiner

*Primary Examiner*—Quyen Leung
*Assistant Examiner*—Naishadh N Desai
(74) *Attorney, Agent, or Firm*—Keating & Bennett, LLP

(57) ABSTRACT

In a motor, an upper surface of a flange portion of a shaft is arranged axially below a bottom end surface of a rotor core. A spacer having an axial thickness slightly greater than that of the flange portion is arranged on a radially outer side of the flange portion. A bottom surface of the spacer makes contact with an end plate whose inner circumferential surface has a radius, centered about a central axis, smaller than a radius of the flange portion. The end plate is secured to the rotor core via a fixing member.

19 Claims, 10 Drawing Sheets

MOTOR

BACKGROUND OF THE INVENTION

1. Field of the Invention

The present invention relates to a motor having improved reliability, and more particularly to an axial movement restriction mechanism and a circular movement restriction mechanism of a shaft and a rotor core affixed to the shaft.

2. Description of the Related Art

A motor used in a vehicle such as a passenger car, or the like, is expected to operate reliably in various environments. In particular, the motor is expected to withstand external vibrations and/or shocks applied to the motor. In order to achieve the expected durability and reliability, the motor includes multiple layers of security features. For example, a plurality of elements forming a rotor of the motor rotating centered about the central axis are configured so as not to move excessively in the axial direction and the circumferential direction.

Hereafter, a configuration of a conventional rotor of a motor will be described with reference to FIG. 10. FIG. 10 is a schematic cross-sectional view of the conventional rotor.

According to FIG. 10, a rotor 6 includes a shaft 61 arranged concentrically with a predetermined central axis J1, a rotor core 62 having an inner circumferential surface which is affixed to an outer circumferential surface of the shaft 61 by adhesive, press fitting, or the like, and a rotor magnet 63 affixed to an outer circumferential surface of the rotor core 62.

Due to such configuration in which the outer circumferential surface of the shaft 61 and the inner circumferential surface of the rotor core 62 are secured to one another via adhesive or press fitting, when an external impact is applied thereto in an axial direction, the shaft 61 and the rotor core 62 may be displaced with respect to one another. When an external diameter of the shaft 61 is small, a contact surface between the outer circumferential surface of the shaft 61 and the inner circumferential surface of the rotor core 62 is limited, and consequently, reliability of the connection between the shaft 61 and the rotor core 62 is compromised.

SUMMARY OF THE INVENTION

In order to overcome the problems described above, preferred embodiments of the present invention provide a motor including a shaft arranged concentrically with a central axis, a rotor core including an inner circumferential surface affixed to an outer circumferential surface of the shaft, a rotor magnet retained by the rotor core, an end plate arranged at least one end surface in the axial direction of the rotor core and including an inner circumferential surface opposite to the shaft, and a fixing member connecting the end plate to the rotor core. The shaft includes a rotor core fixing portion securing the rotor core and a flange portion arranged at one end in the axial direction of the rotor core and having an outer circumferential surface whose radius centered around the central axis is greater than a radius of an inner circumferential surface of the rotor core fixing portion. The radius of the outer circumferential surface of the flange portion is greater than the radius of an inner circumferential surface of the end plate, and the flange portion is arranged in the axial space between the end plate and the rotor core fixing portion.

According to the motor of a preferred embodiment of the present invention, since the flange portion of the shaft is sandwiched between the end plate and the rotor core, when the rotor core moves in the axial direction, due to the contact between the flange portion and either the end plate or the rotor core, such movement is minimized. By virtue of such configuration, an effective axial movement restriction mechanism of the shaft and the rotor core is inexpensively achieved.

Other features, elements, steps, characteristics and advantages of the present invention will become more apparent from the following detailed description of preferred embodiments thereof with reference to the attached drawings.

DETAILED DESCRIPTION OF PREFERRED EMBODIMENT

Figure 1:
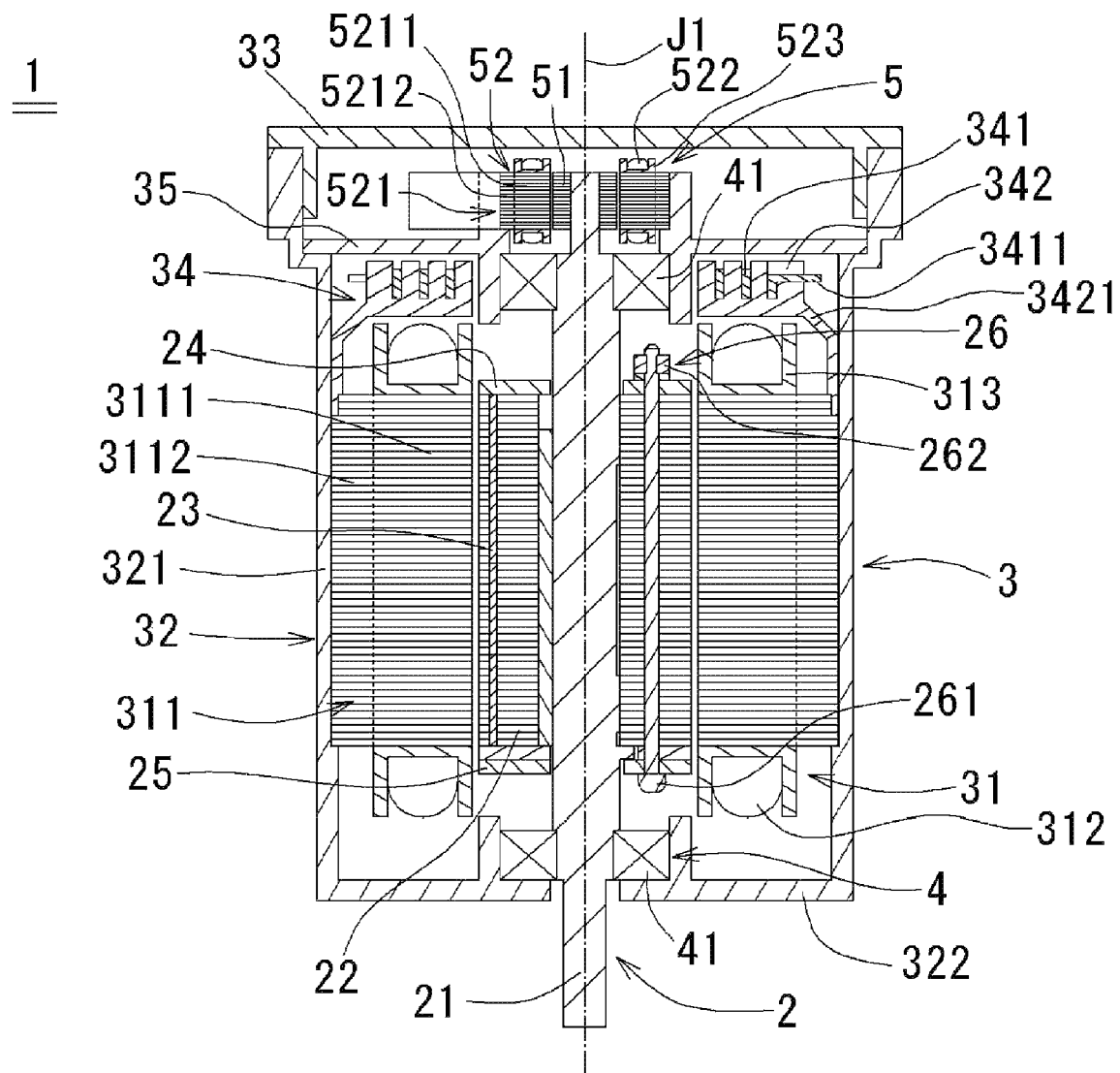
FIG. 1 is a schematic cross-sectional view of a motor according to a first preferred embodiment of the present invention.

Note that in the description of preferred embodiments of the present invention herein, words such as upper, lower, left, right, upward, downward, top, and bottom for describing positional relationships between respective members and directions merely indicate positional relationships and directions in the drawings. Such words do not indicate positional relationships and directions of the members mounted in an actual device. Also note that reference numerals, figure numbers, and supplementary descriptions are shown below for assisting the reader in finding corresponding components in the description of the preferred embodiments below to facilitate an understanding of the present invention. It is understood that these expressions in no way restrict the scope of the present invention.

Structure of Motor

Hereinafter, a motor according to a first preferred embodiment of the present invention will be described with reference to FIG. 1. FIG. 1 is a schematic cross-sectional view of the motor according to the first preferred embodiment of the present invention.

According to FIG. 1, a motor 1 preferably includes a rotor 2 which is arranged and rotates concentrically with a central axis J1, a stator 3 which is arranged radially outwardly of the rotor 2 and generates a rotary torque of the rotor 2, a bearing portion 4 affixed at the stator 3 rotatably supporting the rotor 2, and a sensor portion 5 detecting the position (and/or velocity) of the rotor 2 with respect to the stator 3.

The rotor 2 preferably includes a shaft 21 arranged concentrically with the central axis J1, a rotor core 22 affixed to an outer circumferential surface of the shaft 21 by press fitting or the like and rotating along with the shaft 21, a plurality of rotor magnets 23 each retained by the rotor core 22, end plates 24 and 25 making contact with and covering end surfaces of the rotor core 22 in an axial direction, and a fixing member 26 securing the rotor core 22 to the end plates 24 and 25. The shaft 21 is preferably formed by cutting stainless steel. The rotor core 22 is preferably formed by laminating a plurality of thin magnetic steel plates. The end plates 24 and 25 each are preferably made of aluminum, aluminum alloy, or the like by casting (e.g., die casting).

The stator 3 preferably includes a stator 31 which includes a surface arranged radially opposite from an outer circumferential surface of the rotor core 22, a housing 32 which includes a cylindrical portion 321 retaining the stator 31, a bottom surface 322 covering a lower side of the stator 31 and a lower side of the rotor 2 and an opening facing axially upwardly, a bracket 33 which covers the opening of the housing 32, a busbar unit 34 which is arranged axially on the upper side of the stator 31 and electrically connects the stator 31 to an external power source (not shown), and a lid member 35 which is arranged in an axial space between the housing 32 and the bracket 33 and retains the sensor portion 5.

The stator 31 preferably includes a stator core 311 which is preferably formed by laminating a plurality of thin magnetic steel sheets, a plurality of coils 312 each formed by winding a wire around the stator core 311, and an insulator 313 which is arranged between the stator core 311 and the coils 312 and electrically connects the stator core 311 and the coils 312.

The stator core 311 preferably includes a plurality of tooth portions 3111 each extending toward the central axis J1 and arranged in a circumferential direction evenly apart from one another, and a core back portion 3112 arranged at an outer circumferential portion of each tooth portion 3111 and connecting the tooth portions 3111. The coils 312 are each formed by winding a wire around the tooth portions 3111.

The busbar unit 34 preferably includes a plurality of busbars 341 having a terminal portion 3411 connecting each end of the coils 312, and a busbar holder 342 having an insulating property for retaining the busbars 341. The busbar holder 342 preferably includes a leg portion 3421 for determining a position thereof with respect to the stator 31.

The bottom surface 322 and the lid member 35 of the housing 32 each include a ball bearing 41 of the bearing portion 4.

The sensor portion 5 preferably includes a sensor rotor core 51 whose outer circumferential surface is affixed to the shaft 21 and has a non-circular shape, and a sensor stator 52 having an inner circumferential surface arranged radially opposite from the outer circumferential surface of the sensor rotor core 51. Also, the sensor stator 52 is preferably affixed to the lid member 35. Also, the sensor stator 52 preferably includes a sensor stator core 521 having a plurality of tooth portions 5211 each extending toward the central axis J1 and arranged in the circumferential direction evenly apart from one another, and a core back portion 5212 arranged at an outer circumferential portion of each tooth portion 5211 for connecting the tooth portions 5211, a plurality of sensor coils 522 each formed by winding a wire around the tooth portions 5211 of the sensor stator core 521, an insulator 523 arranged between the sensor stator core 521 and the sensor coils 522 so as to electrically insulate the sensor stator core 521 from the sensor coils 522. Note that an inner circumferential surface of the sensor stator core 521, defined by the inner circumferential surfaces of the tooth portions 5211, has a substantially circular shape centered about the central axis J1. Also note that an external diameter of the shaft 21 which secures the sensor rotor core 51 is smaller than an external diameter of the rotor core fixing portion 211 (described below). Since the outer circumferential surface of the sensor rotor core 51 has a non-circular shape and the inner circumferential surface of the sensor stator 52 has a substantially circular shape, a radial gap arranged therebetween is uneven in the circumferential direction. Also, when the sensor rotor core 51 rotates with respect to the sensor stator 52, a back electromotive force is generated at the sensor coil 522 of the sensor stator 52. The sensor portion 5 detects a position of the sensor rotor core 51 with respect to the sensor stator 52 by sensing the wave of the back electromotive force.

Rotor Configuration

Figure 2:
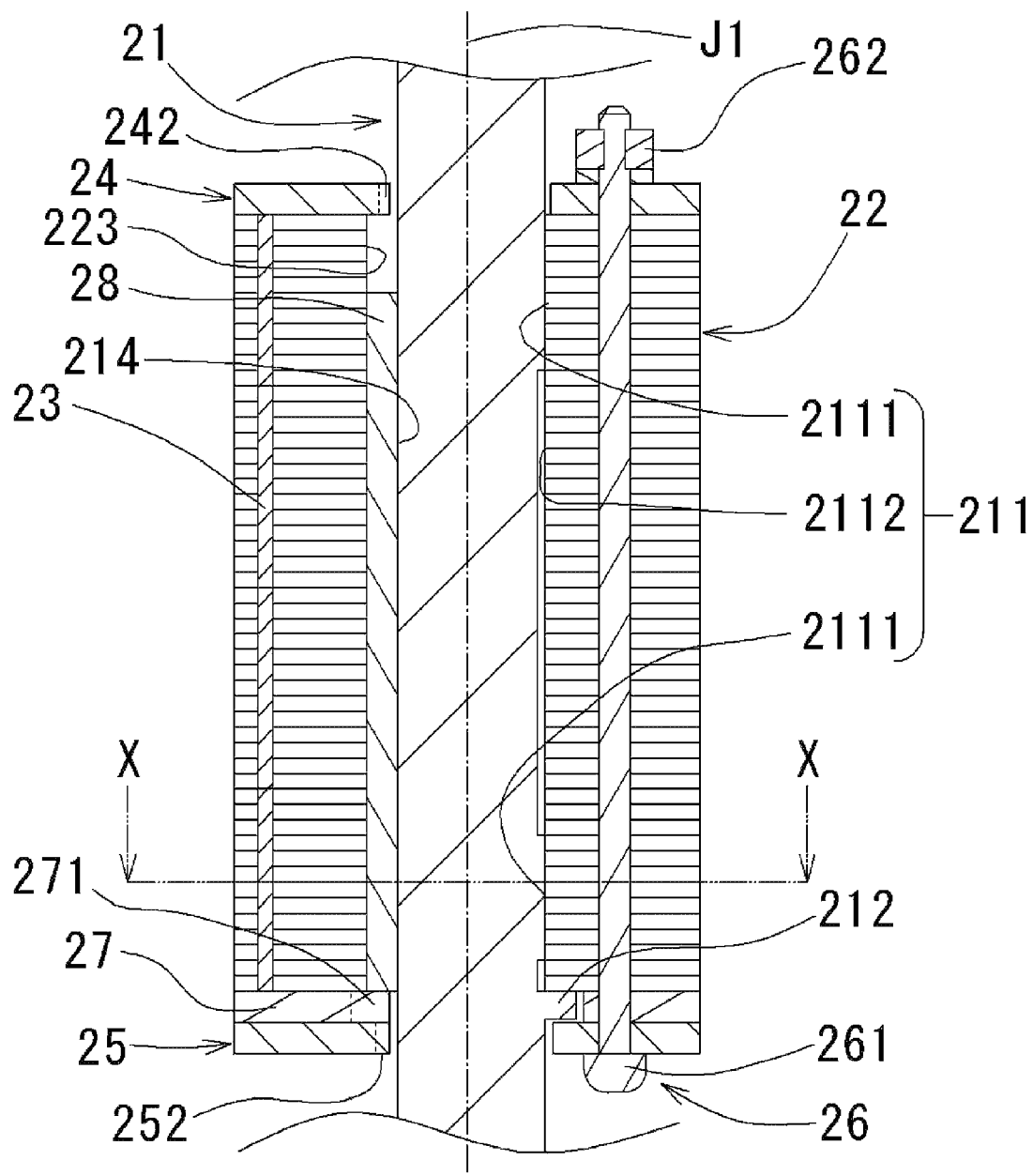
FIG. 2 is a schematic enlarged view of a rotor of the motor shown in FIG. 1.
Figure 3:
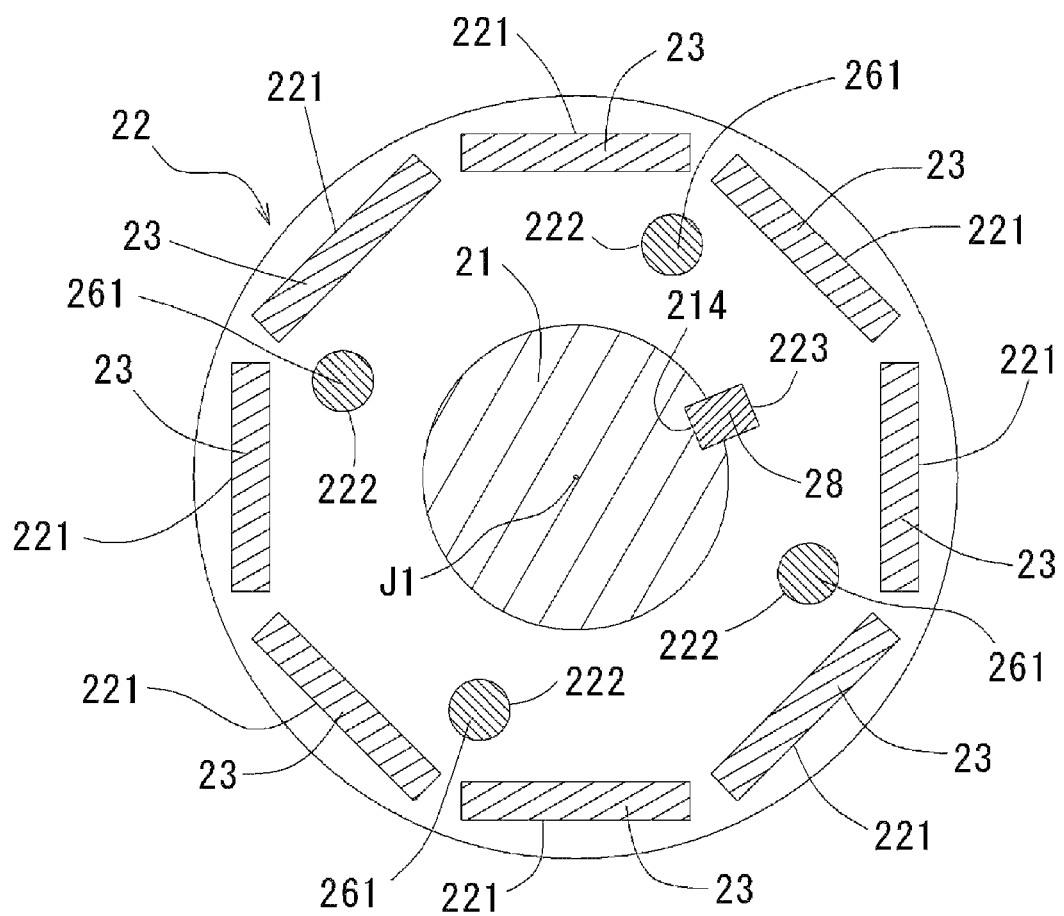
FIG. 3 is a schematic plan view of a portion of the rotor taken along a segment line X-X shown in FIG. 2.

Hereinafter, a detailed configuration of the rotor 2 according to a first preferred embodiment will be described with reference to FIGS. 2 and 3. FIG. 2 is a schematic enlarged view of a portion shown in FIG. 1. FIG. 3 is a schematic plan view of a portion of the rotor 2 taken along a segment line X-X shown in FIG. 2.

According to FIG. 2, the shaft 21 preferably includes the rotor core fixing portion 211 which is arranged radially opposite from the inner circumferential surface of the rotor core 22, and a flange portion 212 which is arranged at a portion axially lower than the rotor core fixing portion 211. Note that a radius centered about the central axis J1 of the flange portion 212 is greater than a radius centered about the central axis J1 of the rotor core fixing portion 211.

The rotor core fixing portion 211 preferably includes a pair of first outer circumferential surfaces 2111 which make contact with the inner circumferential surface of the rotor core 22, and a second outer circumferential surface 2112 whose radius centered about the central axis J1 is smaller than the radius of the first outer circumferential surfaces 2111. Note that the second outer circumferential surface 2112 is arranged axially between the pair of the first outer circumferential surfaces 2111. Also, a gap is arranged between the second outer circumferential surface 2112 and the inner circumferential surface of the rotor core 22. By virtue of such a configuration, the press fitting process between the rotor core 22 and the shaft 21 is carried out effectively. Also, by virtue of such a configuration, an amount of deformation occurring to the inner circumferential surface of the rotor core 22 is minimized.

According to FIG. 3, the rotor core 22 preferably includes a plurality of opening holes 221 each penetrating in the axial direction the rotor core 22 from one axial end thereof to the other. The opening holes 221 accommodate therein the rotor magnets 23, each laminated in the axial direction. The rotor magnets 23 are retained within the opening holes 221 by the end plates 24 and 25 arranged at both axial ends of the rotor core 22 (see FIG. 2). The rotor core 22 also includes a plurality of through holes 222 at which the fixing member 26 is arranged. Note that an axial length of the opening holes 221 and the axial length of the rotor magnet 23 are equal to one another (FIG. 2).

According to FIG. 2, the fixing member 26 preferably includes one or more bolts 261 which extend through the through holes 222 from an axially lower side of the end plate 25 and protrude from the end plate 24 in the axially upward direction, and one or more nuts 262 which make contact with a top surface of the end plate 24.

Axial Movement Restriction Mechanism

Figure 4:
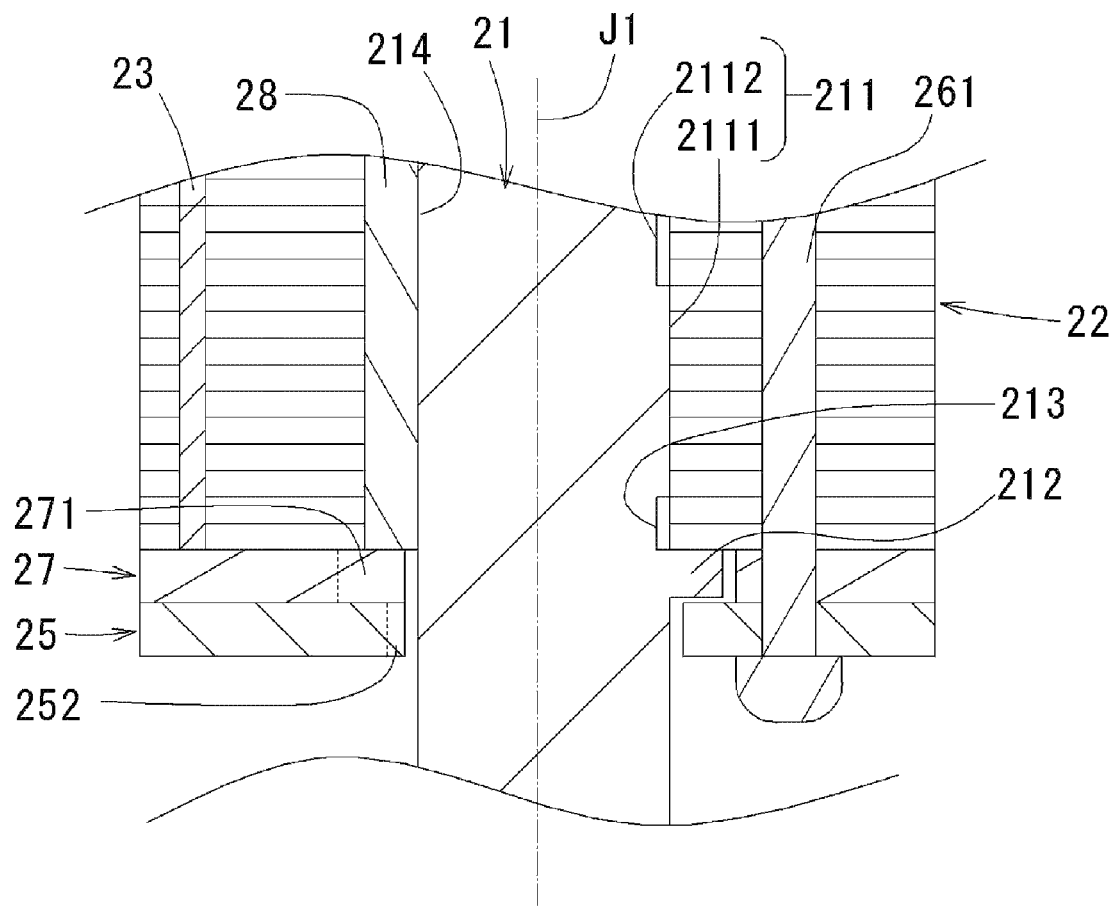
FIG. 4 is a schematic enlarged view of a portion of a shaft and a flange portion shown in FIG. 2.

Hereinafter, an axial movement restriction mechanism which axially retains the shaft 21 and the rotor core 22 of the rotor 2 together according to the first preferred embodiment of the present invention will be described with reference to FIG. 4. FIG. 4 is a schematic enlarged view of a portion of the shaft 21 and the flange portion 212 shown in FIG. 2.

According to FIG. 4, a bottom end surface of the rotor core 22 makes contact with a top surface of the flange portion 212 of the shaft 21. By virtue of such a configuration, an axial position of the rotor core 22 with respect to the shaft 21 is easily determined. Also, the first outer circumferential surface 2111 of the rotor core fixing portion 211 and the flange portion 212 are arranged close to one another in the axial direction. A narrow portion 213 is arranged in the axial space between the rotor core fixing portion 211 and the flange portion 212. A radius centered about the central axis J1 of the narrow portion 213 is smaller than that of the first outer circumferential surface 2111. By virtue of such a configuration, the flange portion 212 makes an appropriate contact with the bottom end surface of the rotor core 22. To be more specific, since the shaft 21 is preferably formed by a cutting process, when the first outer circumferential surface 2111 of the rotor core fixing portion 211 and the flange portion 212 are formed continuously, a portion connecting the first outer circumferential surface 2111 and the flange portion 212 forms a curved surface (not shown) which extends outwardly in the radial direction toward the axially downward direction. When the curved surface makes contact with the inner circumferential edge of the bottom end surface of the rotor core 22, the rotor core 22 may make no contact with the flange portion 212. On the other hand, according to the present preferred embodiment of the present invention, due to the arrangement of the narrow portion 213, the flange portion 212 makes reliable contact with the bottom end surface of the rotor core 22.

Also, a spacer 27 having an annular shape is arranged at a radially outer side of the flange portion 212 overlapping in the radial direction with the flange portion 212, and which is also arranged axially between the end plate 25 and the bottom end surface of the rotor core 22. An outer circumferential surface of the spacer 27 extends substantially continuously with the outer circumferential surface of the rotor core 22. That is, the spacer 27 covers the rotor magnet 23 from the axially lower side thereof. Also, an inner circumferential surface of the spacer 27 is arranged radially opposite from the outer circumferential surface of the flange portion 212. Also, the spacer 27 preferably includes a protrusion portion 271 protruding toward the central axis J1 at a portion thereof at the inner circumferential surface approximately corresponding to a shaft side groove portion 214 (described below) in the circumferential direction.

Also, an axial thickness of the spacer 27 is preferably slightly greater than an axial thickness of the flange portion 212. By virtue of such a configuration, a top surface of the spacer 27 makes contact with the bottom end surface of the rotor core 22, which effectively restricts the axial movement of the rotor magnets 23.

The end plate 25 which is arranged axially below and in contact with the spacer 27 preferably includes an inner circumferential surface through which the shaft 21 is arranged via a gap. That is, a radius of the inner circumferential surface of the end plate 25 at a portion thereof approximately radially corresponding to the flange portion 212 is smaller than the radius of the flange portion 212. By this, the flange portion 212 is sandwiched between the top surface of the end plate 25 and the bottom end surface of the rotor core 22. By virtue of such a configuration, the axial movement of the rotor core 22 with respect to the shaft 21 is effectively minimized wherein the top surface of the end plate 25 and the bottom end surface of the rotor core 22 make contact with the flange portion 212.

Consequently, when an external shock and/or vibration is applied to the motor 1, the rotor core 22 is retained by the shaft 21, thereby achieving a motor with high reliability. Also, since the end plate 25 is secured by the fixing member 26 and the rotor core 22, the end plate 25 is retained by the rotor core 22 even when the external shock and/or vibration is applied to the bottom surface of the flange portion 212 and/or the top surface of the end plate 25.

In general, a shaft and a rotor core are held to each other in the axial direction by pressing an outer circumferential surface of the shaft to an inner circumferential surface of the rotor core. On the other hand, according to the present preferred embodiment, the flange portion 212 arranged at the shaft 21 is retained by the bottom end surface of the rotor core 22 and the end plate 25 so as to achieve the axial movement restriction mechanism minimizing the axial movement of the shaft 21 with respect to the rotor core 22. By virtue of such a configuration, even when the external shock and/or vibration is applied to the motor 1 in the axial direction, the axial movement of the shaft 21 with respect to the rotor core 22 is minimized, thereby providing the motor with high reliability.

Also, due to the axial movement restriction mechanism as described above in which the flange portion 212 is sandwiched in the axial direction by the bottom end surface of the rotor core 22 and the end plate 25, the entire portion of the outer circumferential surface of the rotor core fixing portion 211 is not required to make contact with the inner circumferential surface of the rotor core 22. By virtue of such a configuration, highly secure and reliable connection between the rotor core 22 and the shaft 21 is achieved. It is to be appreciated that when a shaft and a rotor core are connected to one another by pressing, the assembly process may be difficult and the inner circumferential surface of the rotor core may be deformed which compromises the accuracy of the connection therebetween. On the other hand, according to the present preferred embodiment of the present invention, since the rotor core fixing portion 211 includes the second outer circumferential surface 2112, the force required to press the shaft 21 into the rotor core 22 may be reduced which allows more efficient assembly thereof while the accuracy of the connection between the rotor core 22 and the shaft 21 is maintained.

Circumferential Movement Restriction Mechanism

Figure 5:
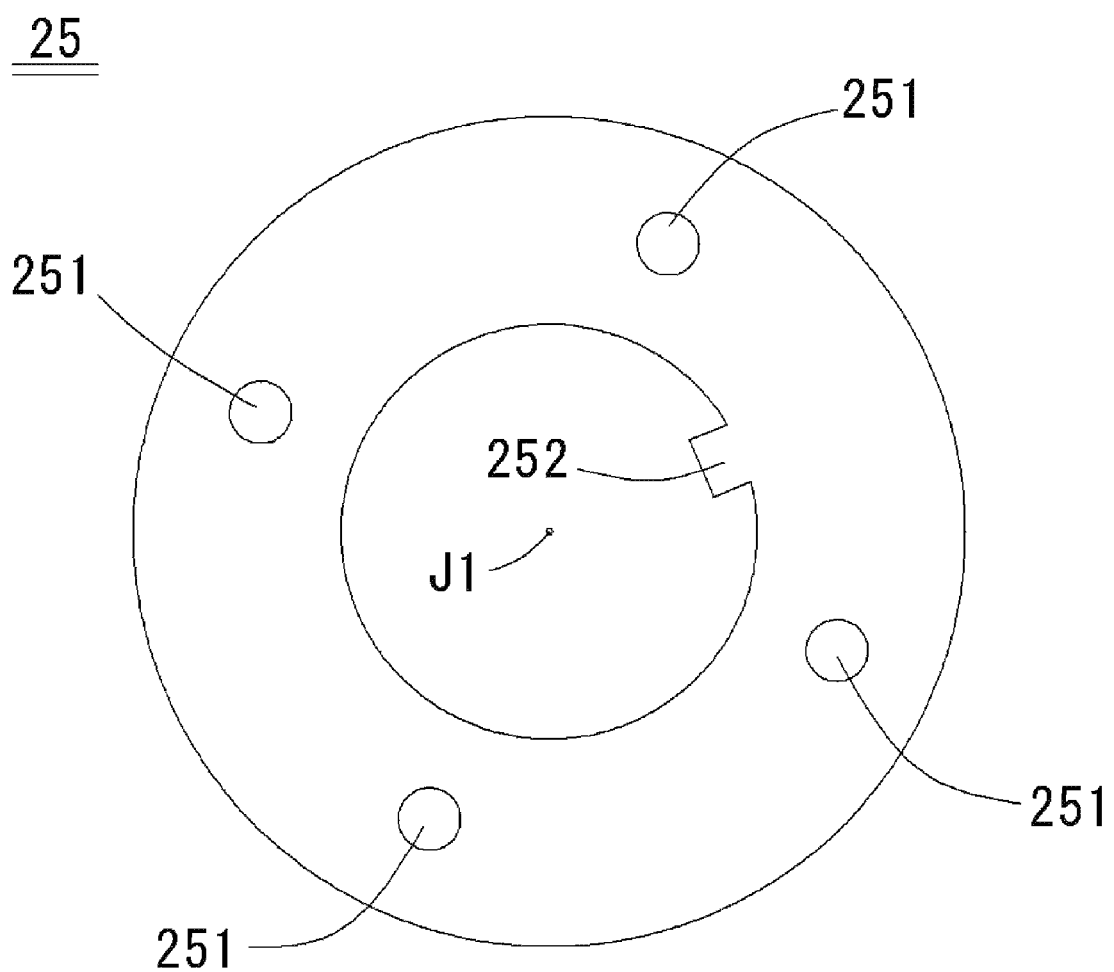
FIG. 5 is a schematic plan view of an end plate.

Hereafter, a first preferred embodiment of a circumferential movement restriction mechanism which restricts a circumferential movement of the rotor core 22 and the end plates 24 and 25 with respect to the shaft 21 will be described with reference to FIGS. 2, 3, and 5. FIG. 5 is a schematic plan view of the end plate 25. Note that a configuration of the end plate 24 is identical to that of the end plate 25.

According to FIGS. 2 and 3, a portion of the outer circumferential surface of the shaft 21 preferably includes a shaft side groove portion 214 which is concave toward the central axis J1. The shaft side groove portion 214 preferably extends from an axially upper portion of the rotor core fixing portion 211 to an axially lower portion of the flange portion 212. Note that a circumferential position of the shaft side groove portion 214 is different from that of the flange portion 212.

Also, the rotor core 22 preferably includes at a substantially same position in the circumferential direction as the shaft side groove portion 214 a rotor core side groove portion 223 which concave away from the central axis J1. The rotor core side groove portion 223 preferably extends from an axially top end surface to the bottom end surface of the rotor core 22.

A through hole defined by the shaft side groove portion 214 and the rotor core side groove portion 223 preferably accommodates therein a substantially elongated circumferential movement restriction member 28. By virtue of such a configuration, the circumferential movement of the rotor core 22 with respect to the shaft 21 is effectively minimized. The circumferential movement restriction member 28 is tightly accommodated within the through hole defined by the shaft side groove portion 214 and the rotor core side groove portion 223.

According to FIG. 5, the end plate 25 preferably includes opening holes 251 through which the fixing member 26 is arranged. Also, the end plate 25 preferably includes at a portion of the inner circumferential surface approximately corresponding to the shaft side groove portion 214 a protrusion portion 252 protruding toward the central axis J1. The protrusion portion 252 is preferably accommodated in the shaft side groove portion 214 so as to minimize the circumferential movement of the end plate 25 with respect to the shaft 21. Note that as described above, the configuration of the end plate 24 preferably is identical to that of the end plate 25 in that elements related to the end plate 25 such as the protrusion portion 252 approximately corresponds to a protrusion portion 242 of the end plate 24.

Figure 6:
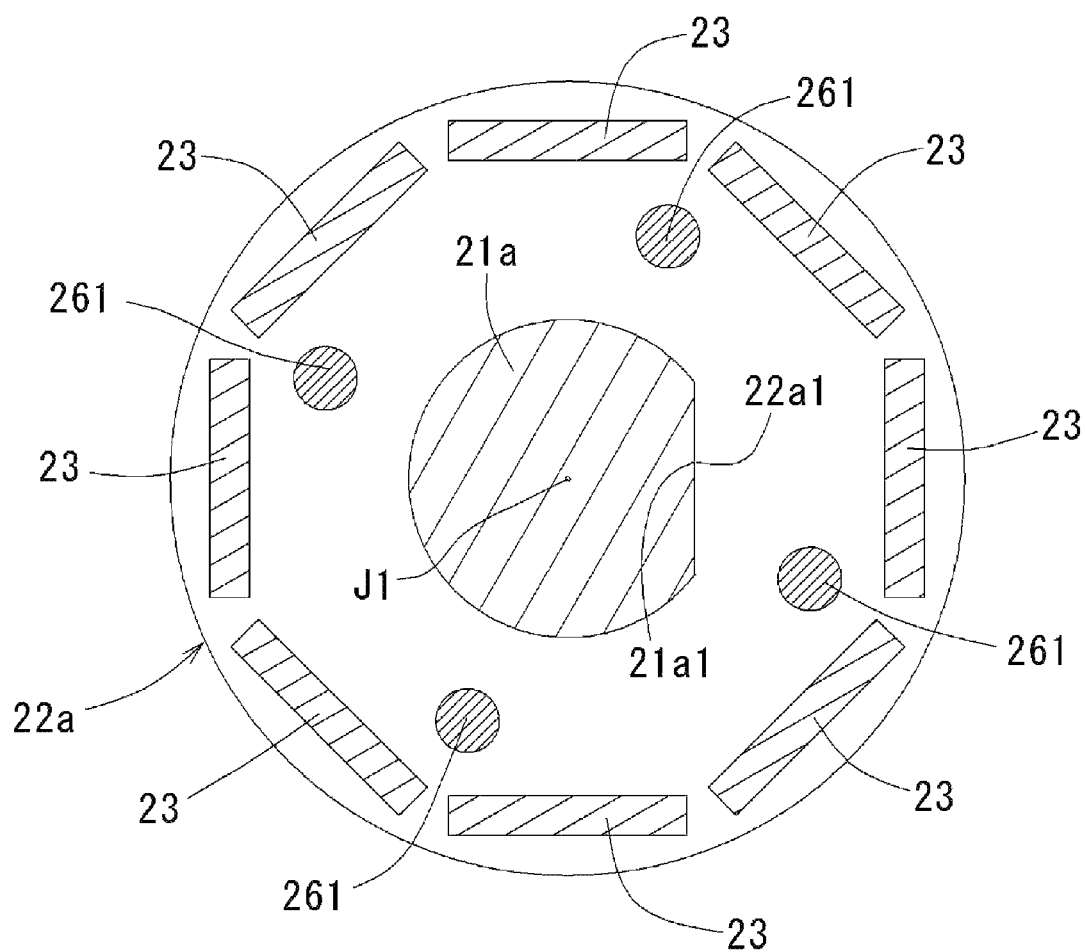
FIG. 6 is a schematic plan view of a circumferential movement restriction mechanism of a motor according to a second preferred embodiment of the present invention.
Figure 7:
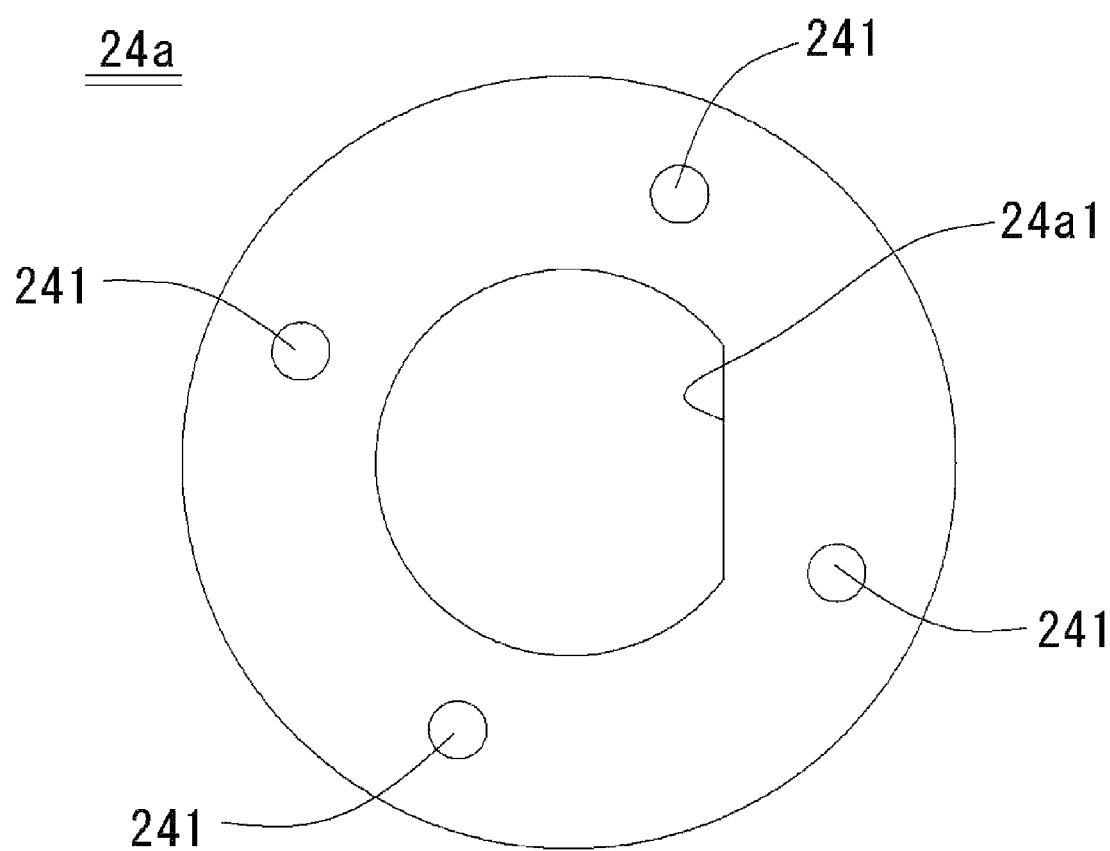
FIG. 7 is a schematic plan view of a circumferential movement restriction mechanism of the end plate of the motor according to the second preferred embodiment of the present invention.

Second Preferred Embodiment of the Circumferential Movement Restriction Mechanism Hereafter, a second preferred embodiment of the circumferential movement restriction mechanism which restricts the circumferential movement of a rotor core and an end plate with respect to a shaft will be described with reference to FIGS. 6 and 7. FIG. 6 is a schematic plan view of a rotor core 22a. FIG. 7 is schematic plan view of the end plate 24a. Note that in the description of the second preferred embodiment of the circumferential movement restriction mechanism, elements similar to those described in the first preferred embodiment are denoted by similar reference numerals, and description thereof is omitted.

According to FIG. 6, the inner circumferential surface of the rotor core 22a preferably includes a rotor core straight line portion 22a1 which is a straight line connecting two points at the inner circumferential surface. Also, the shaft 21a preferably includes at a portion of the outer circumferential surface approximately corresponding to the rotor core straight line portion 22a1 of the rotor core 22, a shaft straight line portion 21a1 having a similar shape as the rotor core straight line portion 22a1. The rotor core straight line portion 22a1 of the rotor core 22 makes contact with the shaft straight line portion 21a1 of the shaft 21 in order to minimize the circumferential movement of the rotor core 22 with respect to the shaft 21.

According to FIG. 7, an end plate 24a preferably includes an end plate straight line portion 24a1 at a portion of the inner circumferential surface approximately corresponding to the shaft straight line portion 21a1 of the shaft 21a. The shaft straight line portion 21a1 of the shaft 21 makes contact with the end plate straight line portion 24a1 of the end plate 24a in order to minimize the circumferential movement of the end plate 24a with respect to the shaft 21. The end plate 24a preferably includes opening holes 241 through which the fixing member 26 is arranged.

Second Preferred Embodiment of the Rotor

Figure 8:
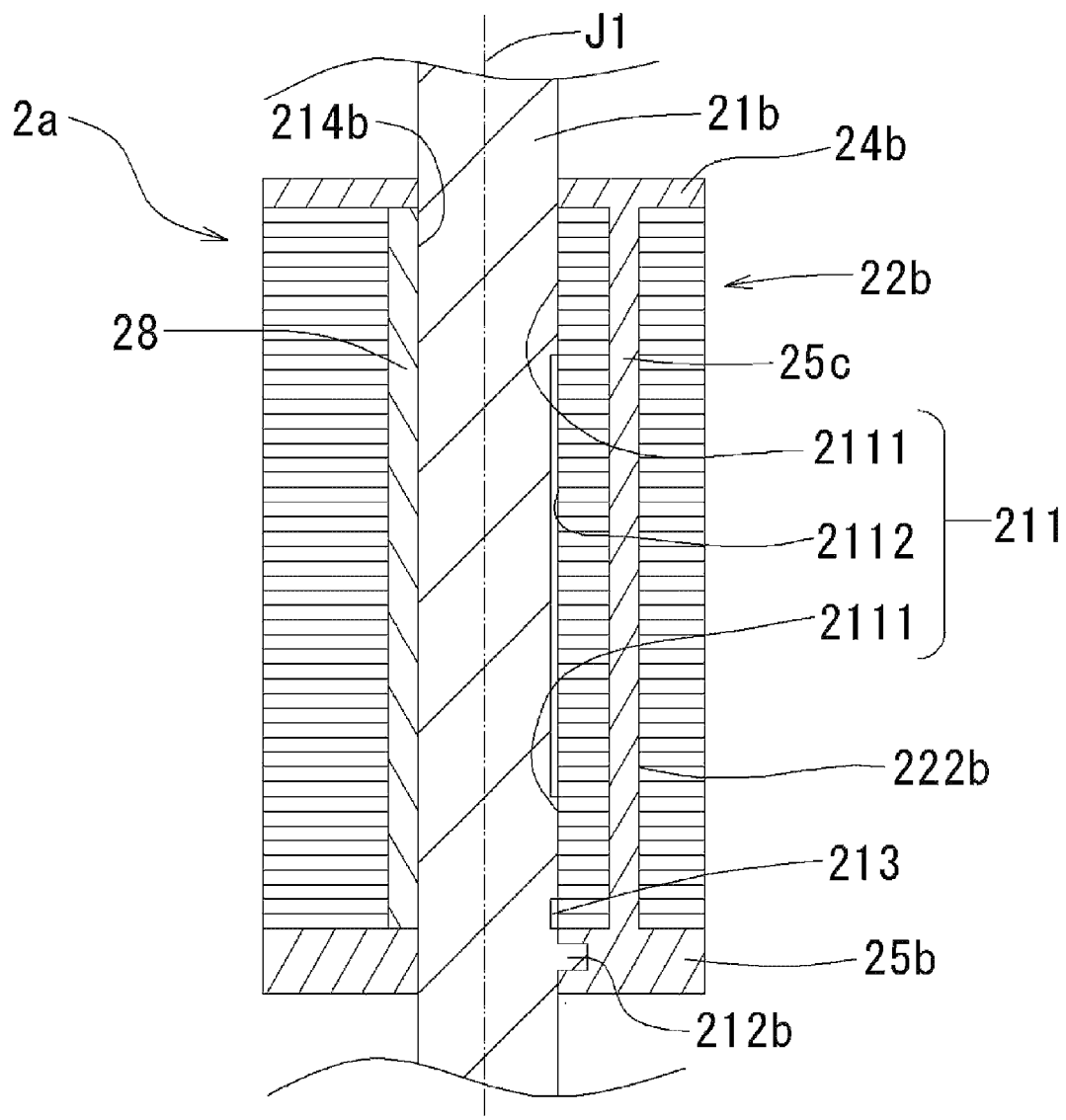
FIG. 8 is a schematic cross-sectional view of a rotor according to a second preferred embodiment of the present invention.

Hereinafter, a second preferred embodiment of the rotor will be described with reference to FIG. 8. FIG. 8 is a schematic cross-sectional view of the rotor according to the second preferred embodiment.

A rotor 2a preferably includes a shaft 21b arranged concentrically with the central axis J1, a rotor core 22b affixed to an outer circumferential surface of the shaft 21b by press fitting or the like and rotating along with the shaft 21b, and end plates 24b and 25b each making contact with and covering end surfaces in the axial direction of the rotor core 22b. The rotor core 22b is preferably formed by laminating in the axial direction a plurality of thin steel plates. Note that the shaft 21b and the rotor core 22b preferably are connected to one another by the same method as the components in the first preferred embodiment, and the description thereof is omitted.

Axial Movement Restriction Mechanism

Figure 9:
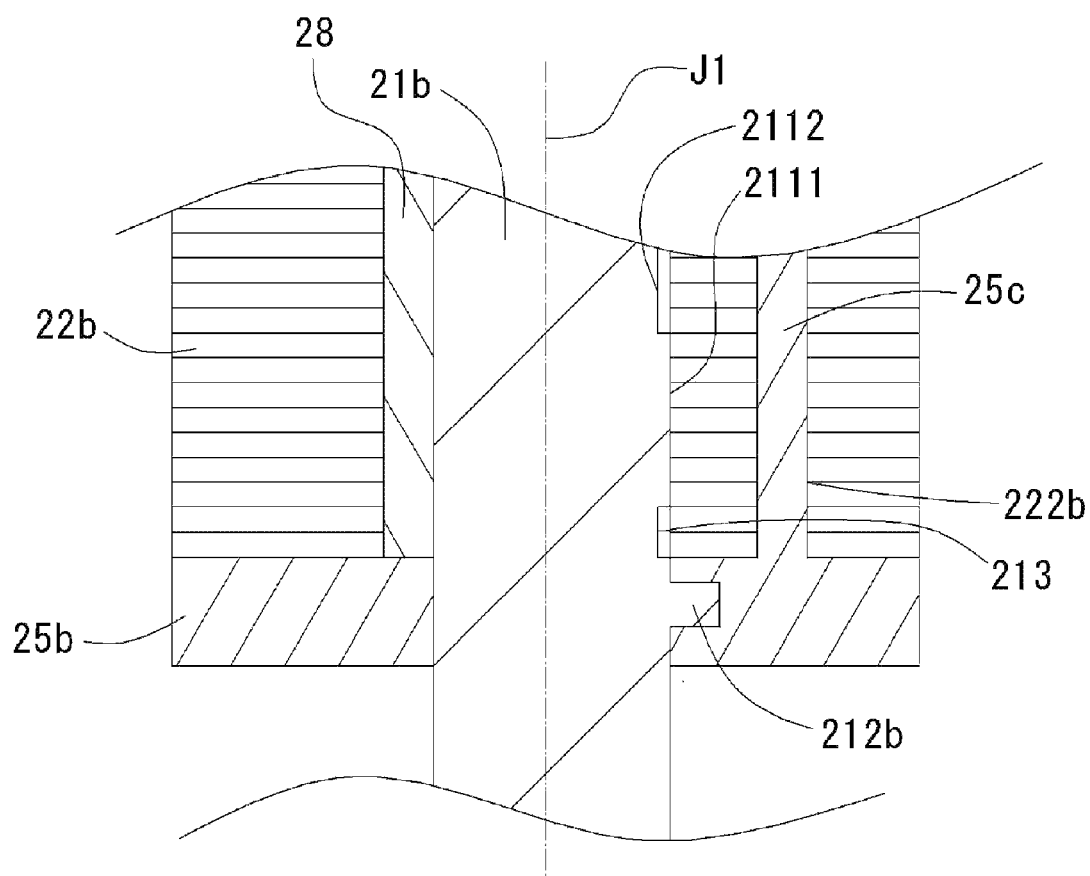
FIG. 9 is a schematic enlarged view of a portion of a shaft and a flange portion shown in FIG. 8.
Figure 10:
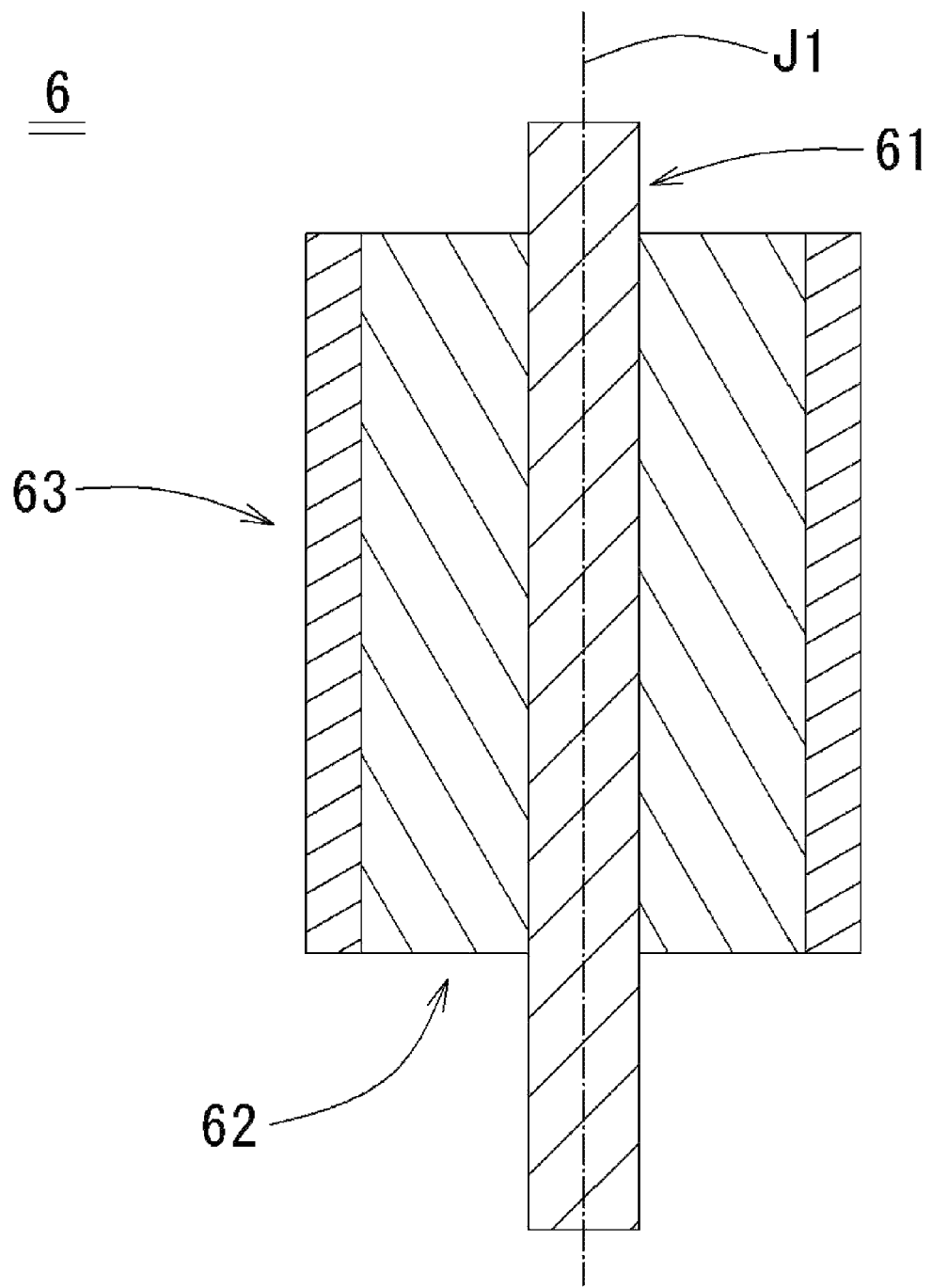
FIG. 10 is a cross-sectional view of a conventional rotor configuration.

Hereinafter, an axial movement restriction mechanism according to the rotor 2b will be described with reference to FIG. 9. FIG. 9 is an enlarged view of a portion of a flange portion 212b of the shaft 21b shown in FIG. 8.

According to FIG. 9, the end plate 25b is shaped so as to cover an axially top surface and an axially bottom surface of the flange portion 212b. By virtue of such a configuration, when an external shock and/or vibration is applied to a motor having therein the rotor 2b and when the rotor core 22b moves in the axial direction with respect to the shaft 21b, the end plate 25b makes contact with the flange portion 212b so as to minimize the axial movement of the rotor core 22b.

The shape of the end plate 25b as described above is preferably formed by die casting, or the like. When the end plate 25b is formed by die casting, it is preferable that a rotor retains no rotor magnet (e.g., rotor 2a shown in FIG. 8). Also, the end plates 24b and 25b may be formed as a single component by molding, wherein a fused material is arranged through the through hole 222b so as to connect the end plates 24b and 25b in an integral manner. Note that the portion connecting the end plates 24b and 25b arranged in the through hole 222b will be referred to as a connecting portion 25c. Also, in the aforementioned configuration, the end plates 24b and 25b each will be two separate plates.

Also, since the shaft 21b includes the shaft side groove portion 214b, a portion of the end plates 24b and 25b will be accommodated in the shaft side groove portion 214b. By virtue of such a configuration, the axial movement and the circumferential movement of the end plates 24b and 25b with respect to the rotor core 22b will be effectively minimized.

As described above, the rotor according to the preferred embodiments of the present invention is particularly suitable for use in a motor which is used in a vehicle (e.g., passenger car) which is expected to operate reliably in various environments withstanding shocks and vibrations.

While the preferred embodiments of the present invention have been described above in detail, it is understood that variations and modifications will be apparent to those skilled in the art without departing the scope and spirit of the present invention.

For example, although the preferred embodiments described above assume that the end plate 25b and the spacer 27 are separate from one another, the present invention is not limited thereto. The end plate 25b and the spacer 27 may be a single component.

For example, the first outer circumferential surface 2111 of the rotor core fixing portion 211 of the shaft 21 may be knurled. The connection between the shaft and the rotor core may be strengthened when the first outer circumferential surface 2111 is knurled so as to provide a motor having further reliability.

What is claimed is:

1. A motor comprising:
a shaft arranged concentrically about a central axis;
a rotor core including an inner circumferential surface affixed to an outer circumferential surface of the shaft;
at least one rotor magnet retained by the rotor core;

an end plate arranged at least one end surface of the rotor core in an axial direction, and including an inner circumferential surface opposite to the shaft; and a fixing member connecting the end plate to the rotor core; wherein the shaft includes a rotor core fixing portion arranged to secure the rotor core and a flange portion arranged at one end in the axial direction of the rotor core, the flange portion having an outer circumferential surface whose radius centered around the central axis is greater than a radius of an inner circumferential surface of the rotor core fixing portion;

the radius of the outer circumferential surface of the flange portion is greater than the radius of an inner circumferential surface of the end plate; and the flange portion is arranged in an axial space between the end plate and the rotor core fixing portion.

2. The motor according to claim 1, wherein a portion of the end plate is arranged radially outwardly of the outer circumferential surface of the flange portion and overlapping with the flange portion in the axial direction, and the fixing member is arranged radially outwardly of the outer circumferential surface of the flange portion.

3. The motor according to claim 1, wherein the rotor core includes at least one opening hole along the axial direction, the at least one rotor magnet is accommodated in the at least one opening hole, and the end plate includes two end plates arranged at a first end and a second end in the axial direction of the rotor core and covers the at least one opening hole.

4. The motor according to claim 1, wherein the end plate includes a portion arranged at least one end of the flange portion in the axial direction and overlapping in the axial direction with the flange portion, and a spacer arranged at least one end of the end plate in the axial direction, the spacer including a portion overlapping in a radial direction with the flange portion and having an inner circumferential surface whose radius is substantially equal to or greater than a radius of the outer circumferential surface of the flange portion.

5. The motor according to claim 4, wherein a thickness in the axial direction of the spacer is substantially equal to or greater than a thickness in the axial direction of the flange portion.

6. The motor according to claim 1, wherein the rotor core fixing portion of the shaft includes a knurled portion.

7. The motor according to claim 1, wherein the shaft includes, at a portion thereof axially between the rotor core fixing portion and the flange portion, a narrow portion whose radius centered about the central axis is smaller than the radius of the shaft, and the narrow portion is formed continuously with the flange portion.

8. The motor according to claim 1, wherein the rotor core fixing portion of the shaft includes:

a pair of first outer circumferential surfaces arranged to make contact with the inner circumferential surface of the rotor core; and a second outer circumferential surface whose radius centered about the central axis is smaller than a radius of the first outer circumferential surface;

one of the pair of first outer circumferential surfaces is arranged above the other first outer circumferential surface in the axial direction; and the second outer circumferential surface is arranged between the pair of the first outer circumferential surfaces in the axial direction.

9. The motor according to claim 1, wherein the outer circumferential surface of the shaft includes, at a portion thereof in a circumferential direction, a shaft side groove portion along the axial direction;

the rotor core includes, at a portion in the circumferential direction at the circumferential surface corresponding to the shaft side groove portion, a rotor core side groove portion along the axial direction; and a circumferential movement restriction member is accommodated in a through hole defined by the shaft side groove portion and the rotor core side groove portion.

10. The motor according to claim 9, wherein the end plate includes a protrusion portion inserted in the shaft side groove portion.

11. The motor according to claim 1, wherein the outer circumferential surface of the shaft corresponding in a radial direction to the inner circumferential surface of the end plate includes, in a circumferential direction, a shaft straight line portion which is a straight surface formed along the axial direction; and the inner circumferential surface of the end plate includes, at a portion thereof corresponding to the shaft straight line portion, an end plate straight line portion which makes contact with the shaft straight line portion.

12. A vehicle comprising the motor according to claim 1.

13. A motor comprising:

a shaft arranged concentrically about a central axis;

a rotor core including an inner circumferential surface affixed to an outer circumferential surface of the shaft;

a rotor magnet retained by the rotor core; and an end plate arranged at least one end surface of the rotor core in an axial direction, and including an inner circumferential surface opposite to the shaft; wherein the shaft includes a rotor core fixing portion arranged to secure the rotor core and a flange portion arranged at one end in the axial direction of the rotor core, the flange portion having an outer circumferential surface whose radius centered about the central axis is greater than a radius of an inner circumferential surface of the rotor core fixing portion;

the radius of the outer circumferential surface of the flange portion is greater than the radius of an inner circumferential surface of the end plate; and the flange portion is arranged in an axial space between the end plate and the rotor core fixing portion.

14. The motor according to claim 13, wherein a narrow portion, whose radius centered about the central axis is smaller than a radius of the rotor core fixing portion, is arranged in the axial direction between the rotor core fixing portion and the flange portion, and the narrow portion is formed continuously with the flange portion.

15. The motor according to claim 13, wherein the rotor core fixing portion of the shaft includes:

a pair of first outer circumferential surfaces arranged to make contact with the inner circumferential surface of the rotor core; and a second outer circumferential surface whose radius centered about the central axis is smaller than a radius of the first outer circumferential surface;

one of the pair of first outer circumferential surfaces is arranged above the other first outer circumferential surface in the axial direction; and the second outer circumferential surface is arranged between the pair of the first outer circumferential surfaces in the axial direction.

16. The motor according to claim 15, wherein the outer circumferential surface of the shaft includes, at a portion thereof in a circumferential direction, a shaft side groove portion, and the end plate includes a protrusion portion inserted in the shaft side groove portion.

17. The motor according to claim 13, wherein the end plate is defined by a member covering an upper side and a lower side of the flange portion in the axial direction.

18. The motor according to claim 13, wherein the end plate includes a first plate covering one axial end and a second plate covering another axial end of the rotor core, and a connecting portion connecting the two plates.

19. A vehicle comprising the motor according to claim 13.

* * * * *